United States Patent [19]
Pearson

[11] 3,811,568
[45] May 21, 1974

[54] PARTS SEPARATORS
[75] Inventor: Irving T. Pearson, Sterling, Mass.
[73] Assignee: Nelmor Co. Inc., Worchester, Mass.
[22] Filed: Dec. 13, 1972
[21] Appl. No.: 314,853

[52] U.S. Cl. ................................................ 209/99
[51] Int. Cl. ............................................. B07b 1/12
[58] Field of Search ........... 209/97, 98, 99; 198/219

[56] References Cited
UNITED STATES PATENTS
2,302,088  11/1942  Aller ..................................... 209/99
3,412,859  11/1968  Thornton ............................. 198/219
3,612,269  10/1971  Anderson ........................... 209/99 X
3,672,496  6/1972  Williams ............................. 209/99 X

*Primary Examiner*—Richard A. Schacher
*Attorney, Agent, or Firm*—Maurice R. Boiteau

[57] ABSTRACT

A machine for separating plastic parts from runners comprising a conveyor section carrying the parts from the mold to a separating section. The separating section comprises elongated rods alternating with parallel orbitally movable bars, the bars lifting and conveying runners to the end of the machine and the parts falling between the rods and the bars into a collecting box.

4 Claims, 4 Drawing Figures

PARTS SEPARATORS

BACKGROUND OF THE INVENTION

One of the problems in the molding of, e.g., small plastic parts resides in the separation of the parts from the runners and this is usually done by hand. It is obvious that if this operation could be performed automatically by machinery there would be a great saving in time and labor. Although parts separators have been suggested in the past, the present invention provides a machine having few working parts and low power requirements together with a long trouble free operation, easy adjustment for different sizes of parts molded, with increased flexibility in the use of the machine.

SUMMARY OF THE INVENTION

An open frame is provided having a conveyor at one end thereof carrying molded parts and runners from the molding machine along the frame toward the center thereof. At the center of the frame there is a downwardly inclined apron, and a series of longitudinal fixed spaced narrow rods alternating with a series of parallel longitudinal blade-like members or bars to receive the molded parts and runners proceeding down the apron. The bladelike members or bars are moved in an orbit which is in general with relation to the parts fed to it up, forwardly, down, and reverse. Depending upon the parts molded, the rods and the bars are spaced apart a distance to allow the parts to fall between them into a collecting bin or an off-conveyor, whereas the runners are of a configuration which will not allow them to fall between the bars and the rods, but will in a step by step fashion be carried forward to the end of the frame where they fall by gravity into a collecting bin, or a conveyor which conveys them to a collection point or to a grinder recirculator.

PREFERRED EMBODIMENT OF THE INVENTION

Figure 1:
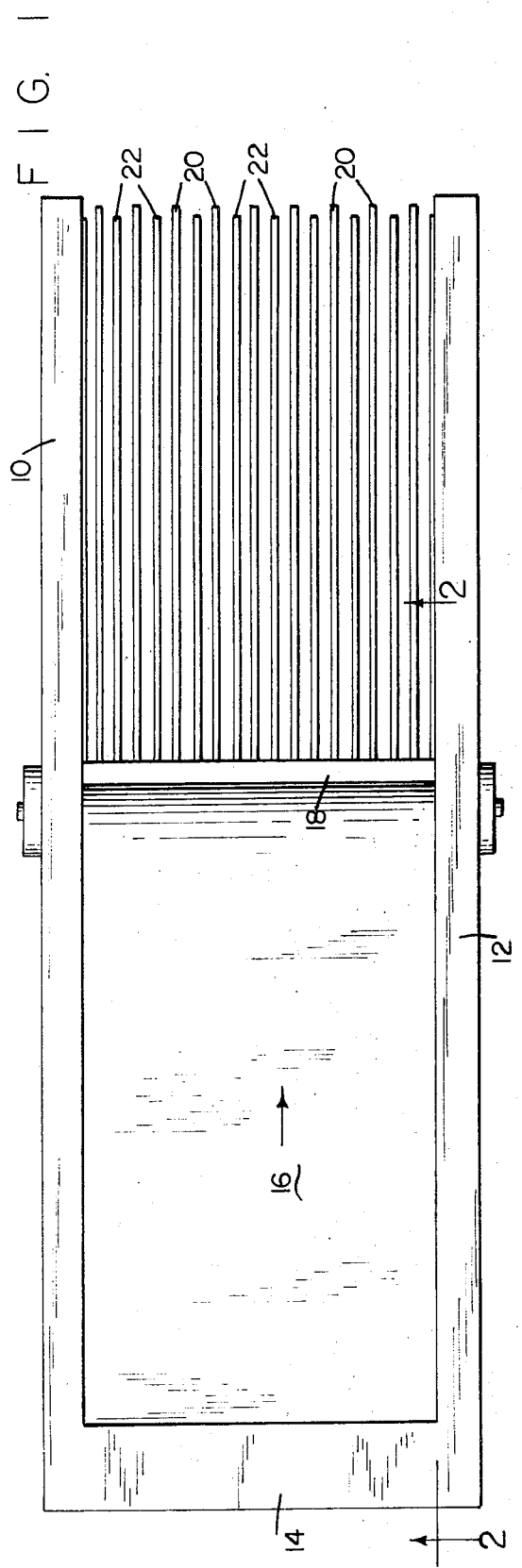
FIG. 1 is a top plan view of a machine according to the invention.

A generally U-shaped elongated frame is provided, this frame having a pair of spaced longitudinal frame members 10 and 12, a closed rear end 14, and a completely open front end.

At the rear portion of the frame there is provided a belt conveyor 16 traveling in the direction of the arrow thereon. This conveyor carries parts and runners to an apron 18 which deposits parts and runners onto an alternating series of fixed parallel spaced rods 20, 20, and bars or vertically arranged blades 22, 22. In some cases the blades have their upper edges serrated for better grip of the runners.

Figure 2:
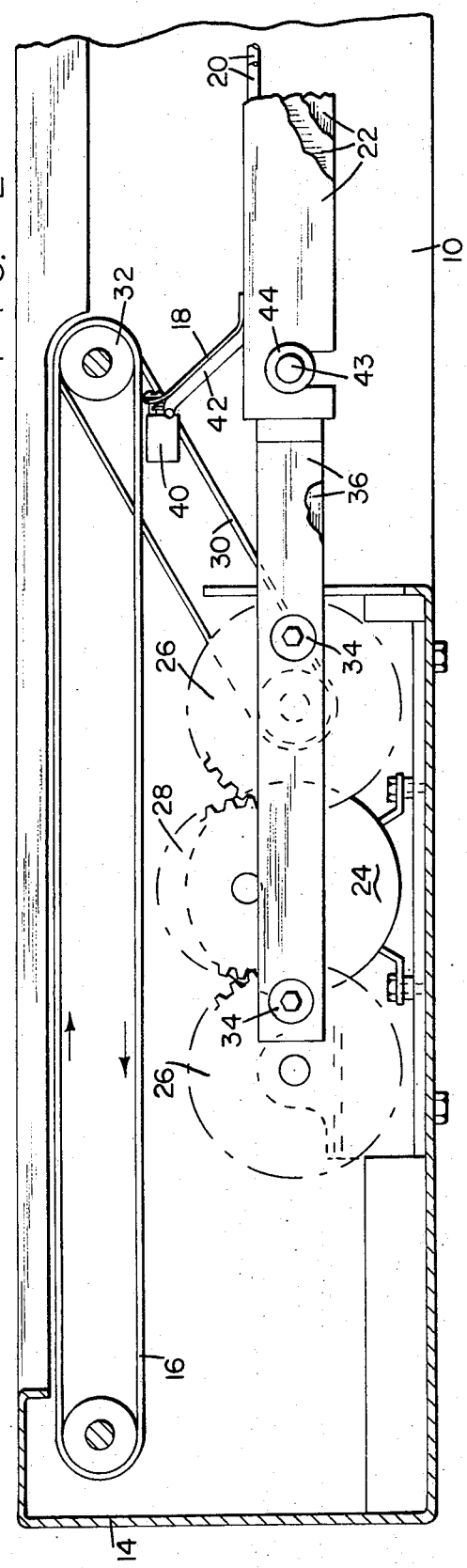
FIG. 2 is a longitudinal section therethrough.
Figure 3:
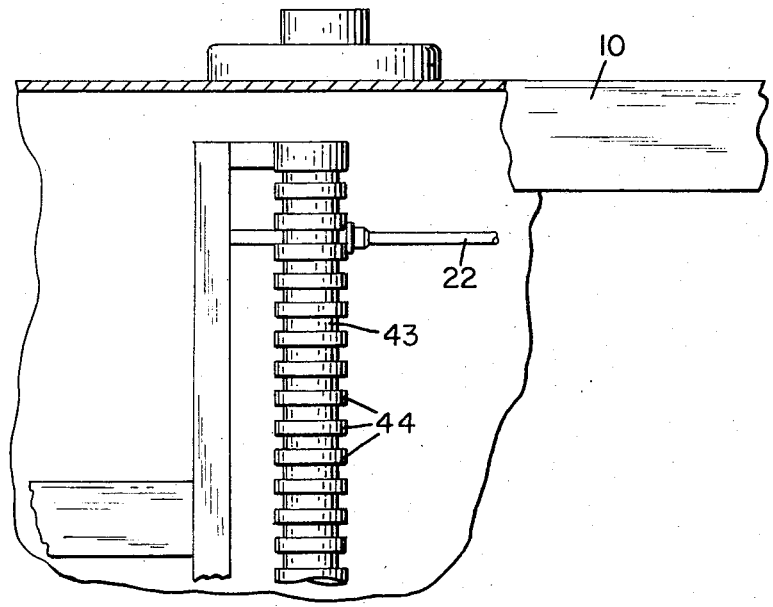
FIG. 3 is a detailed plan view showing the spacing of the bars.

Now referring to FIG. 2 there is shown a motor 24 which is concealed from view by the side walls of the frame. This motor is geared to a pair of like gears 26, 26 through an intermediate gear 28, gears 26, 26 rotating in the same direction. One of the gears 26 may be provided with a belt or the like 30 driving a pulley 32 in turn driving the conveyor 16.

Gears 26, 26 each are provided with an eccentric bearing or trunnion for shafts 34, 34 both of which pass through bars 36, 36, connected to bars 22, 22 driving the same in an orbit; up, forwardly, down the back.

Rods 20 are supported by means of brackets or the like 40 attached to the side walls of the frame and having depending rear angle portions 42 tending to support the apron 18 as shown in FIG. 2, the apron 18 however yielding if needed to allow the orbital motion of the bars 22.

At the rear end of the bars 22 there is a rod 42 with a series of spaces 44 thereon spacing the bars apart and holding them together as a unit.

Figure 4:
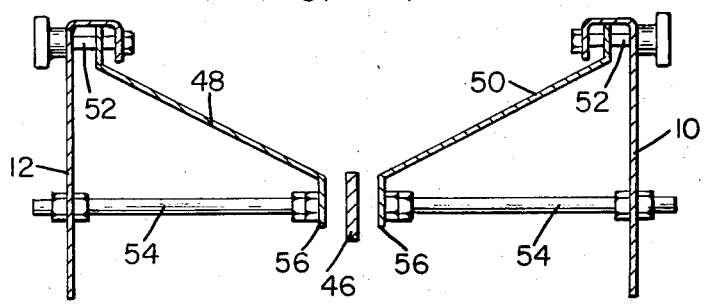
FIG. 4 is a transverse sectional view showing the use of a novel chute which is used alternatively when smaller runners than usual are to be separated from a part.

Referring now to FIG. 4 there is shown a modification doing away with the rods and using a single bar 46. The single bar 46 is interposed between a pair of longitudinal but laterally extending inclined chutes 48 and 50 secured on bolts or the like 52, 52 to the upper edges of the frame members 10 and 12 and also by similar but longer bars or bolts 54, 54 low on the side walls. The chutes can be adjusted by means of the bolts for various spacings between the downturned ends 56, 56 of the chutes and the bar 46, so that the spaces for dropping of the parts there-between can be made narrow, where the parts are extremely small, or the runners are small.

Having thus disclosed my invention, what I claim as new and desire to secure by Letters Patent of the United States is:

1. A parts separator comprising a frame having sidewalls, an open discharge end, a conveyor in the frame at the opposite end driven to carry parts toward the discharge end, a series of longitudinal parallel spaced rods fixedly secured at one end and extending from the conveyor toward the discharge end of the frame, a series of parallel movable bars spaced from and alternating with respect to the rods and having top edges and means for moving the bars in orbit forwardly toward the discharge end with their top edges above the rods and rearwardly in the opposite direction with their top edges below the rods, the bar moving means including a pair of synchronized cranks and a link extending between the cranks and connected to one end of the bars.

2. A parts separator according to claim 1 further characterized in that the cranks are coplanar and spaced apart in the direction of motion of the bars and that each crank has gear teeth cut in its periphery and further comprising a drive gear interposed between and in mesh with the teeth of both discs.

3. A parts conveyor according to claim 1 further comprising a flexible apron extending from the discharge end of the conveyor to the bars at a location near the connection between the link and the bars.

4. A parts separator comprising a frame including side members and an open forward portion, a pair of opposed chutes each extending downwardly from one of the side members toward a generally central lower edge, the edges of the two chutes being disposed in generally parallel spaced apart relationship and defining between them an interval through which undersized parts drop, means for adjusting the spacing between the edges of the chutes, a movable bar extending between the edges and means for moving the bar through an orbit forwardly with its upper edge above the edges of the chutes and rearwardly below the edges of the chutes, the bar moving means including a pair of synchronized cranks and a link extending between the cranks and connected to one end of the bar.

* * * * *